United States Patent [19]

Walker et al.

[11] 4,162,741
[45] Jul. 31, 1979

[54] PRESSURE COOKER

[75] Inventors: Duane H. Walker, Fall Creek; Darrell W. Quarderer, Eau Claire, both of Wis.

[73] Assignee: National Presto Industries, Inc., Eau Claire, Wis.

[21] Appl. No.: 914,439

[22] Filed: Jun. 12, 1978

Related U.S. Application Data

[63] Continuation of Ser. No. 792,347, Apr. 29, 1977, abandoned.

[51] Int. Cl.² .............................................. B65D 51/16
[52] U.S. Cl. ..................................... 220/203; 137/467;
137/516.25; 220/206; 220/208; 220/298; 220/316
[58] Field of Search ................... 137/467, 533, 516.25;
220/203, 298, 316, 206, 208

[56] References Cited

U.S. PATENT DOCUMENTS

| 1,208,041 | 12/1916 | Steere | 220/316 |
|---|---|---|---|
| 1,821,726 | 9/1931 | Saporta | 220/314 |
| 2,301,724 | 11/1942 | Vischer | 220/203 |
| 2,308,320 | 1/1943 | Stephens | 220/316 |
| 2,483,297 | 9/1949 | Naylor | 220/203 |
| 2,529,767 | 11/1950 | Gorfin | 220/316 X |
| 2,538,583 | 1/1951 | Morrison, Jr. | 220/203 X |
| 2,549,387 | 4/1951 | Richeson | 220/298 |
| 2,584,759 | 2/1952 | Swenson | 220/316 X |
| 2,592,992 | 4/1952 | Abercrombie | 220/206 X |
| 2,614,722 | 10/1952 | Wyman | 220/316 X |
| 2,623,657 | 12/1952 | Devries | 220/298 |
| 2,627,997 | 2/1953 | Wittenberg | 220/316 X |
| 2,860,811 | 11/1958 | Hessler | 220/203 |
| 2,948,431 | 8/1960 | Kuhn | 220/298 |
| 3,973,694 | 8/1976 | Tess | 220/206 |

FOREIGN PATENT DOCUMENTS

| 1075908 | 2/1960 | Fed. Rep. of Germany | 220/316 |
|---|---|---|---|
| 1038865 | 10/1953 | France | 220/316 |
| 615768 | 1/1949 | United Kingdom | 220/316 |

*Primary Examiner*—Allan N. Shoap
*Attorney, Agent, or Firm*—Merchant, Gould, Smith, Edell, Welter & Schmidt

[57] ABSTRACT

A pressure cooker has a cover which is removably secured in pressure-tight relation to the cooker body. The cover has a centrally disposed valve, which regulates pressure development in the cooker, and an overpressure release plug in the cover margin adjacent a cover handle, which separates from the cover in response to excessive pressure development in the cooker is captivated by an overhang portion of the cover handle which directs the escaping fluids away from the hand grip portion of the handle. The cooker also has a pressure-actuated interlock in the margin of its cover opposite the cover handle which inhibits removal of the cover when the cooker is in a pressurized condition, and prevents pressure build up in the cooker when the cover is incompletely locked to the cooker body.

27 Claims, 18 Drawing Figures

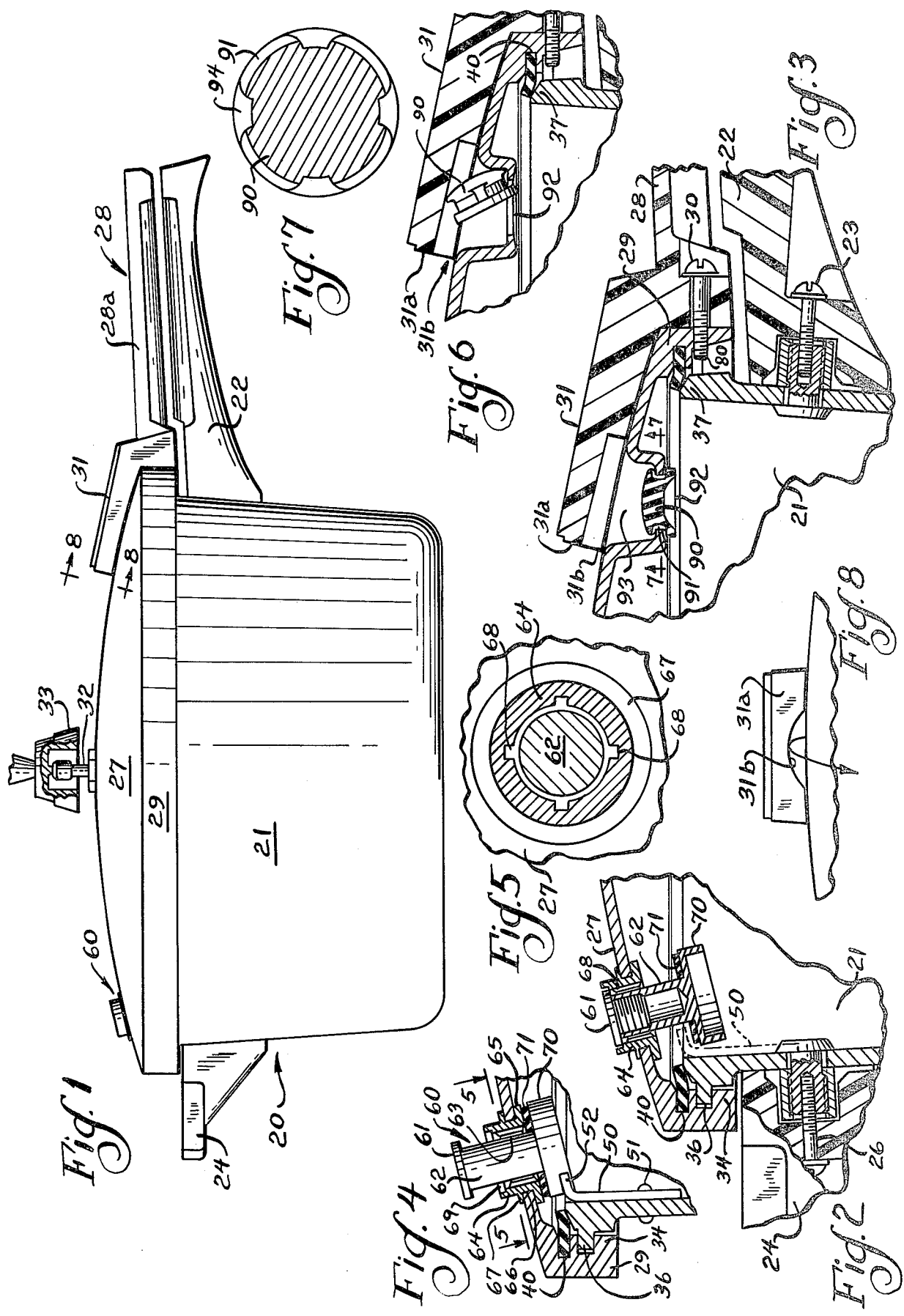

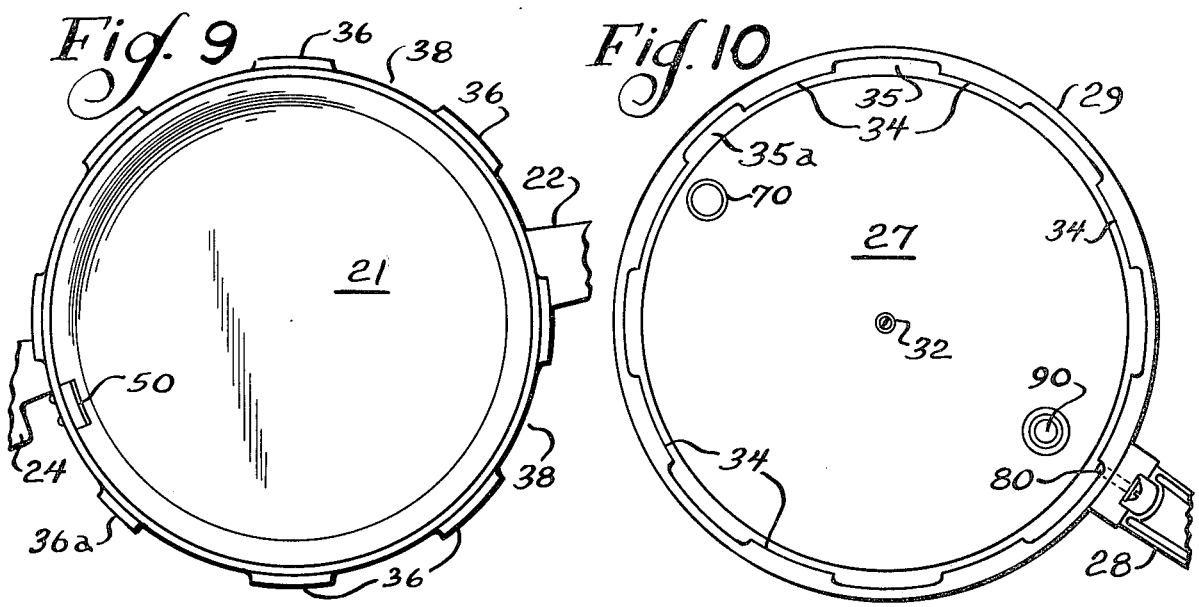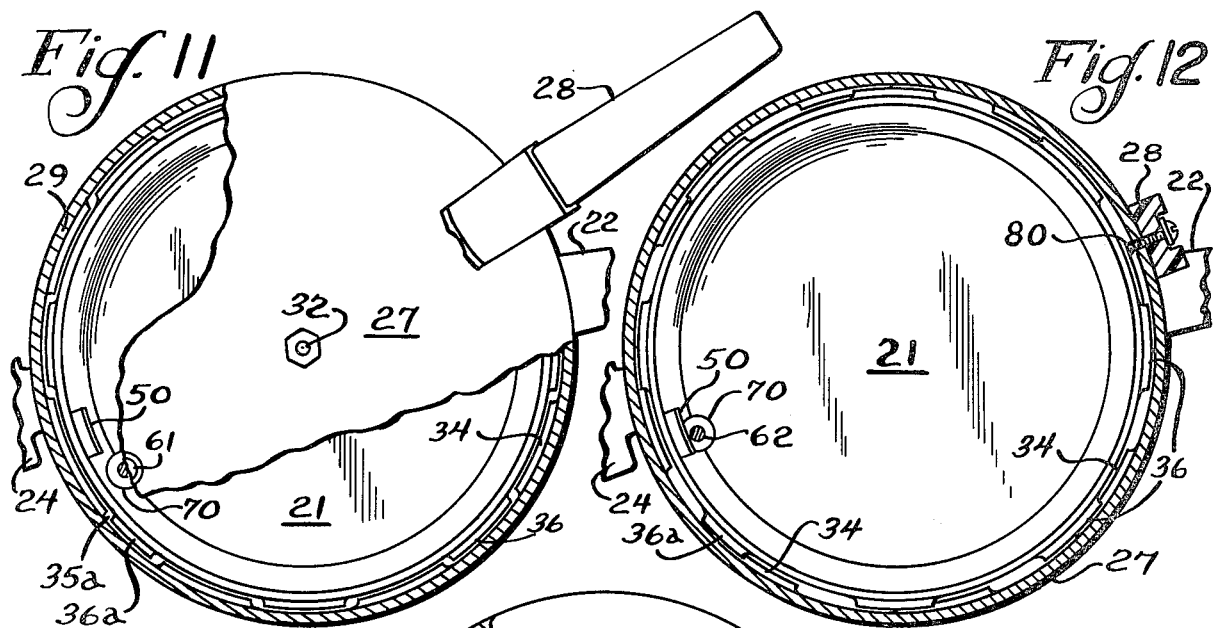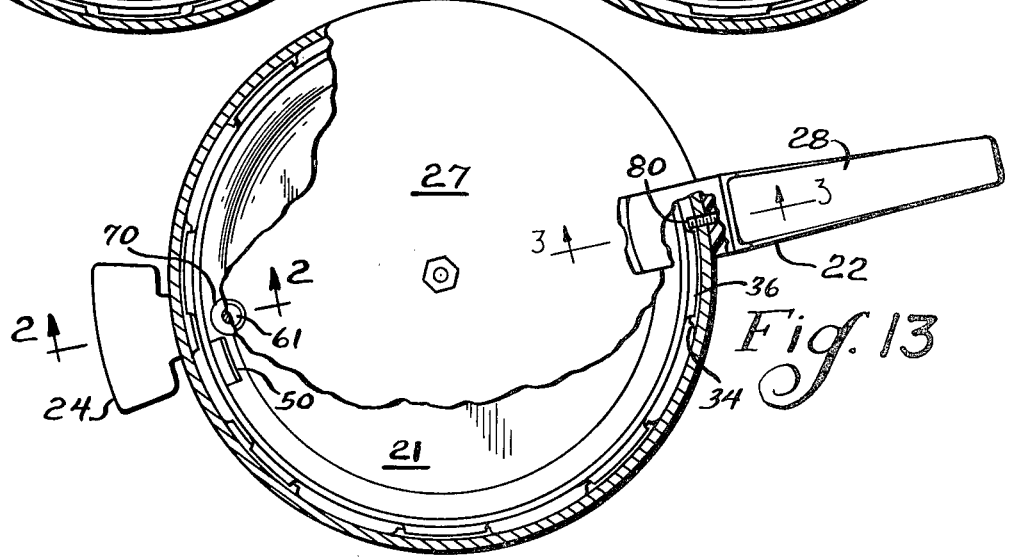

PRESSURE COOKER

This application is a continuation of application Ser. No. 792,347, filed Apr. 29, 1977, and now abandoned.

This invention relates to pressure cookers and particularly to those which are utilized in the home to prepare food for the table and includes canners.

Such cookers conventionally consist of a vessel or body having an open top through which water and food to be cooked or jars containing food to be "canned" are loaded, the top being afterwards closed by a cover which is releaseably sealed fluid-tight to the cooker body to produce a closed container in which pressure develops when subjected to heat to effect the cooking or canning process, to result in a superpressure condition in which the pressure within the cooker exceeds that ambient to the cooker.

Conventionally, the cover of such cookers is provided with a vertical vent pipe on which loosely rests a weight to regulate the pressure developed in the cooker during the cooking act. Such cookers commonly also contain a plug, usually in the cover, which is designed to be ejected to relieve pressure within the cooker before it reaches a dangerous level.

In one pressure cooker available commercially, both the cover and the cooker body are provided with circumferentially spaced lugs at their periphery which are interengaged by relative rotation of the cooker body and its cover, the effect of which is to urge the upper edge of the cooker body against an appropriately located gasket or other resilient member supported by the cover thereover so as to effect the required fluid tight seal therebetween.

Pressure cookers including the described type are used by persons of varying skills and understanding of the operation of a pressure cooker, and who, on occasion may incompletely or improperly secure the cover to the cooker body. Experience has indicated that a substantial risk exists that the cover may be blown from the cooker body should the cover, through carelessness or otherwise, be incompletely locked to the cooker body. This may occur because, in closing the cover on the cooker, the cover lugs were imperfectly engaged beneath the cooker body lugs. The potential hazard also exists when an attempt is made prematurely to rotate the cover to remove it before the cooker pressure has been reduced to a safe level.

For these and other reasons, much effort has been expended by manufacturers in an effort to incorporate safety devices in such cookers which would lessen the possibility of injury to the user, and bystanders or the surrounding environs as well.

For example, in Wittenberg U.S. Pat. No. 2,627,997, there is disclosed a safety lock for pressure cookers wherein the cooker body and cover lugs are provided with one or more relieved areas or recesses which come into play to interrupt cover rotation should a user attempt to separate the cover from the body before the internal pressure in the cooker has dissipated. In the cover rotating act, high portions of one set of lugs catch within the relieved areas of the other lugs so as to permit axial separate of the cover from the body which is sufficient to interrupt the seal and allow pressure to escape, but at the same time preventing further relative rotation of the member toward an unlocked position until the pressure has subsided.

In Wyman U.S. Pat. No. 2,614,722, there is disclosed a pressure cooker in which the cover is assembled by locating one-half the circumferential extent of its edge beneath an inwardly turned lip on the cooker body also having an angular extension of 180°. Once in place, the opposite edge is locked by latching a hook on the cover handle beneath a second shorter lip at the opposite side of the cooker. A pin loosely mounted in the cover rises to indicate pressure developing in the cover and pressure is relieved by swinging back a weighted valve which is hinged to the cover handle and in the cooking operation sits on a vent pipe in the cover adjacent said handles. A loosely mounted pin in the cover rises therethrough to indicate the presence of pressure developing in the cooker; and in the illustrated form, also passes through a notch provided in the edge of a lip fixed to the cooker above the cover to prevent opening thereof.

In Steere U.S. Pat. No. 1,208,041, pressure developing in the cooker acts against a diaphram fixed to the underside of the cover. This causes a plunger to rise and force radially extending rods to engage beneath peripheral portions of the cooker kettle and so prevents cover removal. In Saporta U.S. Pat. No. 1,821,726, pressure developing in the cooker acts on a pin causing it to rise into a position where it inhibits loosening of a wing nut utilized to clamp the cover to the kettle.

Numerous manually manipulated interlocks also have been utilized in the past to vent the pressure kettle in the act of unclamping or removing the cover from the kettle.

In accordance with the present invention, the cover of a pressure cooker is sealed fluid tight over and about the open top of the cooker body utilizing circumferentially spaced lugs on the cover which interengage beneath similarly located lugs spaced about the cooker body so that, with related rotation of the cover and body, the cover is effectively drawn toward the cooker body and the top edge of the cooker body is forced to effect a seal with a resilient gasket confined interiorly of the cover. Such a method of sealing the cover of a pressure cooker thereto is well-known.

However, it is a feature of the present invention that lugs of one set are so keyed to the lugs of the other set that the cover may be closed over the top edge of the cooker body in only one position of its lugs relative to the spaces between the body lugs. In that one position, a pressure-operated lock is located immediately ahead of a lock bracket or abutment fixed to the cooker body so that when the cover is fully rotated to effect the required seal the lock is relocated to assure that whenever pressure exists in the cooker to a dangerously high level, the cover cannot be removed as by forcibly rotating the cover in reverse in an attempt to overcome the frictional engagement existing between the cooker body lugs and the underengaging cover lugs. Secondly, the locking means is so arranged that when the cover is not locked and is only incompletely locked to the cooker body, dangerously high pressure cannot develop within the cooking.

In a preferred embodiment of the invention, the locking member normally hangs loosely through a vent opening provided in the cover margin and preferably is located radially opposite a handle attached to the cover. The locking member includes a retainer cap which in the relaxed condition of the locking member closes the vent opening. It also has an enlarged head or catch portion at its lower end which hangs low enough to pass freely beneath the lock bracket or abutment as the cover is rotated to engage its lugs beneath the cooker body lugs and draw the cover downwardly to effect its seal with the cooker body. Once the cover has been rotated far enough to center the cover lugs beneath the cooker body lugs, the catch portion of the locking member has moved far enough to clear the lock bracket. Thereafter, as heat is applied to the cooker, the forming steam acts on the catch portion causing it to rise, and the retainer cap to lift off the vent opening, allowing the cooler non-saturated air to escape. If the cover has been rotated far enough that the locking member has cleared the lock bracket, as the steam pressure builds up, the locking member will continue to rise until its catch portion seals against the underside of the cover. At this height, it is in direct line with the abutment portion of the lock bracket where it will remain as long as there is more than 0.5 p.s.i. in the cooker. Any attempt to open the pressure cooker during this time, by reverse rotating the cover, will be defeated by the catch portion of the locking member. However, should the user through carelessness or otherwise have failed initially to rotate the cover far enough so that the locking member clears the lock bracket, then as pressure starts to develop in the cooker, the lock member will rise enough to lift the retained cap off the vent opening. However, the catch portion is prevented by the abutment of the lock bracket from rising further and so the cooker remains vented to atmosphere and dangerously high pressure does not build up in the cooker.

An important feature of the invention, therefore, is the relation of the dimensions of the abutment portion of the cooker portion and the catch portion of the cooker cover to the angle through which the cover is rotated to effect the fluid tight seal therebetween and the cover body.

A further feature is that the lugs of the cover and of the cooker body are so arranged and related to each other that in the one position in which the cover an be assembled over the top of the cooker body to locate the cover lugs below the body lugs, the catch portion is located immediately ahead of the abutment portion so that with any interengagement of the cooker body and cover lugs, the catch portion is located beneath the lock bracket abutment to prevent pressure build up in the cooker except and until the lugs have been properly aligned, and to locate the locking member in its operative locking position.

A further feature of the invention is the stop means provided which limit rotation of the cover relative to the cooker body to an angle which is just sufficient to relocate the catch portion to the opposite side of the lock bracket and clear of its abutment portion.

Thus, an important feature of the invention is that means are provided which maintain the cover locked against rotation when the cooker is in a pressurized state and also prevents build up of dangerously high pressure in the cooker when the cover is not properly locked to the cooker body, thus eliminating the potential hazard of the cooker being opened when in a pressurized state.

A further feature of the invention is the provision of a weighted pressure regulating valve which is centered on the cover to control the pressure which develops within the cooker during the cooking operation and the captivation of an overpressure plug separate from said pressure regulating valve and vent opening in which the cover interlock operates.

A further feature of the invention is the captivation of said overpressure plug in a cavity provided between the cover and an overhanging portion of the cover handle. The cavity serves to catch or restrain the overpressure release plug when ejected from the cover in response to excessive pressure build up in the cooker. At the same time, said overhang portion of the cover handle causes the escaping fluids which discharge through the plug-vacated opening in the cover to be directed away from the cooker handles to minimize possible injury to a user who instinctively grasps the disabled cooker by its handles in an effort to move the cooker off the heat source or to a more appropriate and safer location.

Thus, the invention provides a pressure cooker which not only assures proper regulation of the developed pressure during cooking, but provides one which cannot be placed in a pressurized state except when its cover is properly secured to the cooker body so that the cover cannot be, accidentally or intentionally, forced open when the cooker is in a pressurized state.

At the same time, the invention provides a pressure cooker that is both safe and effective in its operation; and, from a manufacturing point of view, is economical and practical to manufacture.

It will be further appreciated that said described interlocks and pressure controls are either confined within the interior of the cooker or arranged in a manner as not to detract from the appearance of the cooker.

Many other objects, advantages and features of the invention will be apparent upon consideration of the presently preferred embodiments of the invention which now will be described in connection with the figures of the accompanying drawings which illustrate the said embodiments.

Referring now to the drawings

FIG. 1 thereof illustrates in side elevation, a first embodiment of the invention wherein the pressure cooker is constructed of cast or wrought metal such as aluminum or stainless steel;

FIG. 2 is a sectional fragmentary view taken through a fragmented portion of the pressure cooker along line 2—2 in FIG. 13, and illustrates details in the construction of the pressure-operated cover interlock;

FIG. 3 is a sectional view taken along line 3—3 of FIG. 13, being partially fragmentary, and illustrates details in the construction of an overpressure release plug and its captivation by the overhang portion of the cover handle;

FIG. 4 is a view generally similar to FIG. 2 and illustrates the cover lock in its cover locking position;

FIG. 5 is a fragmentary transverse sectional view taken through the locking member along line 5—5 in FIG. 4, looking in the direction indicated by the arrows, and shows further details in the construction of the locking member;

FIG. 6 is a view generally similar to FIG. 3 and shows the overpressure release plug ejected from the cover and confined within the cavity beneath the handle overhang portion and the path of the escaping fluid;

FIG. 7 is a transverse sectional view taken along line 7—7 of FIG. 3 through the overpressure release plug and shows details in the construction of said plug;

FIG. 8 is a fragmentary view taken along line 8—8 of FIG. 1 looking in the direction indicated by the arrows and illustrates the exit in the terminal wall of the handle overhang through which the escaping fluids released by ejection of the overpressure release plug are directed;

FIG. 9 is a top plan view of the cooker with the cover removed;

FIG. 10 is a plan view taken of the underside of removed cover to show the arrangement of its lugs;

FIG. 11 is a top plan view of the pressure cooker with the cover in place but with parts broken away to show the relationship of the cover lugs to the cooker body lugs when the cover is initially assembled with the cooker body and before being rotated clockwise to locate the cover interlock member in its locking position;

FIG. 12 is a view generally similar to FIG. 11 and illustrates the relationship of the plunger to the lock bracket of the cooker body when the cover has been rotated through an angle which incompletely locks the cover to the cooker body;

FIG. 13 is a view generally similar to FIG. 11 and illustrates the position of the cover interlock when the cover has been rotated to its fully locked position in which position the cover handle is aligned with the elongated cooker body handle;

Figure 14:
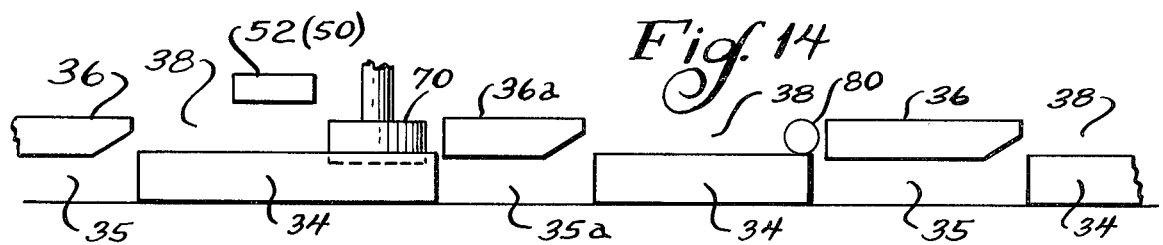
FIG. 14 is a diagrammatic view which illustrates the relationship the cover lugs, the cooker body lugs, the cover lock member, and the locking bracket of the cooker body assume when the cover is first assembled on the cooker body as illustrated by FIG. 11.

Referring now more particularly to the several views wherein like parts are identified by like reference numerals, FIGS. 1, 2 and 3 of the drawings illustrate the invention embodied in a pressure cooker of cast aluminum metal and of a size suitable for domestic use, the same being designated generally by reference numeral 20. Cooker 20 has a food receiving body member or vessel 21 with an open top through which it is loaded with food to be cooked or the like. Its body 21 is illustrated provided with an elongated handle 22 of a suitable heat insulating plastic such as phenolic resin which is secured to the cooker body wall by suitable means such as screw 23 (FIG. 3). Optionally, the cooker body 21 may be provided with a second smaller handle 24 of the so called server type, also of a heat insulating plastic such as phenolic resin, removably mounted to the cooker body wall as by a threaded screw 26 (FIG. 2). Cooker 20 is illustrated provided with a cover 27 adapted to fit on and be closed against the open top of the cooker body member 21 in fluid tight relation therewith. Cover 27 also has an elongated handle 28 which is connected to a surrounding continuous depending flange portion 29 of the cover as by a mounting screw 30 (FIG. 3). In the fully closed or locked position of the cover to the cooker body, the cover handle 28 has been rotated from its initially assembled offset relation (FIG. 11) into its superimposed aligned relationship over the handle 22 of the cooker body (FIG. 13). Said cover handle 28 also includes an overhang portion 31 which extends over a marginal portion of the cover 27 for a purpose as afterwards explained.

Disposed centrally of and establishing communication with the interior of the cooker body when closed by cover 27 is a vent pipe 32 on which a weighted indicator device 33 rests, the weight of said indicator 33 being relied upon to maintain a predetermined pressure within the cooker during the cooking or canning process as is conventional.

Figure 15:
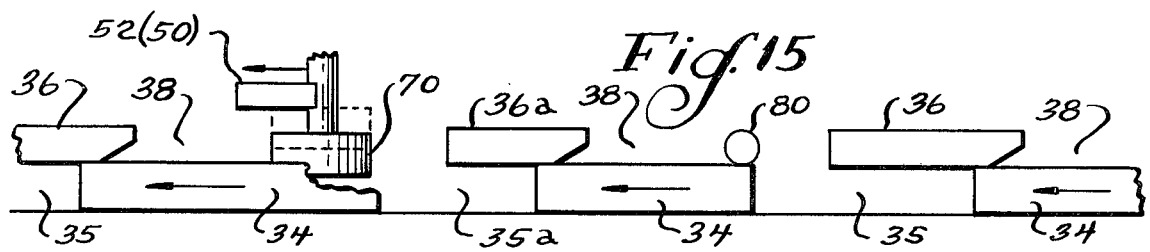
FIG. 15 illustrates the relationship which said cover lugs, cooker body lugs, the lock bracket and the locking member assume when the cover has been partially closed as illustrated by FIG. 12.
Figure 16:
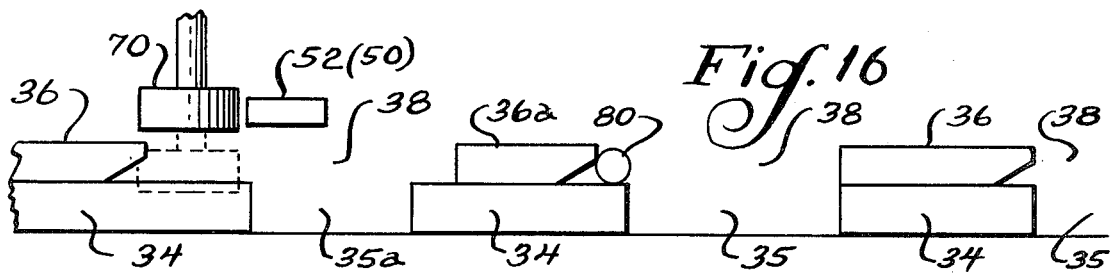
FIG. 16 illustrates the relationship which said cover lugs, cooker body lugs, lock bracket and locking member assume when the cover has been completely closed to the limit permitted by the stop means.

Considering now also FIGS. 9, 10 and 11, flange 29 of cover 27 is shown to be provided with a plurality of generally equally dimensioned circumferentially extending lugs 34 which are spaced apart by generally equi-sized recesses or relieved areas 35. One of said recesses 35a, however, is of substantial less circumferential or angular extent than are the others. As illustrated in FIG. 9, the cooker body 21 also has a plurality of generally equi-sized and spaced lugs 36 which are disposed immediately below the upper beveled top edge 37 thereof (FIG. 2) one lug 36a of said cooker body lugs, however, being smaller in angular extent than are the other lugs 36. The body lugs 36 and their separating spaces 38 are so related to the dimensions of the cover lugs 34 and their spacings 35 that the cover 27 can be assembled over the open top of the cooker body and the cover lugs 34 lowered through the spaces 38 between the cooker body lugs 36, only in one keyed position of the cover that position being when space 35a between the cover lugs is aligned with the cooker body lug 36a. In said keyed position of the cover 27 over the cooker body 21, (with the body lugs 36 projecting upwardly through the cover spaces 35 and the key body lug 36a through the cover space 35a as illustrated in FIG. 11) the cover may be rotated clockwise on the vertical axis of the cooker relative to the body 21 to force the cover lugs 34 beneath the cooker body lugs 36 and centered therebeneath in which position (FIG. 13), as illustrated by FIGS. 2 and 3, cover 27 and a gasket 40 support by lugs 34 are drawn against the beveled edge 37 of the cooker to effect a fluid tight seal between the cover and cooker body. As illustrated in FIGS. 14, 15 and 16, preferably the leading edges of the undersides of the cooker body lugs 36 all is slightly tapered or beveled to facilitate reception and movement of the cover lugs 34 therebeneath with clockwise rotation of the cover.

A feature of the invention is the novel means brought into play to interlock the cover to the cooker body when the cover is thus sealed thereto and which prevents the user from removing the cover whenever the cooker is in a pressurized state. Referring, therefore, now to FIGS. 2, 4 and 5, said interlock means is seen to include an abutment member 50, which is suitably riveted or otherwise rigidly fixed to the cooker body 21, and a locking member 60 reciprocably mounted to cover 27. FIGS. 2 and 4 illustrates said abutment member 50 as being fixed by rivets 51 to the inner side of the cooker body vertical wall 21 and having an integral inwardly disposed horizontal portion 52, sometimes hereinafter referred to as a "lock abutment", located immediately adjacent said inner-side of cooker body wall and immediately above its top edge 37 and locking lugs 36.

Still referring to FIGS. 2 and 4, the locking member 60 is illustrated as comprising an internally threaded cylindrical stem 62 into which a retainer cap 61 is threadedly connected. Stem 62 of the plunger 60 is illustrated as reciprocally mounted vertically through the bore 63 of a sleeve 64 fixed in a opening 66 provided in the cover 27. For this purpose, sleeve 64 has an integral flange portion 65 which engages the underside of the cover wall 27 about opening 66 and is held in place as at 67 by press fitting against the outer side of the cover about said opening. Preferably stem 62 has an outside diameter only slightly less than the inside diameter of the bore 63 through the sleeve 64 so that said bore constitutes a vent opening through which the interior of the cooker has communication with the outside. The bore walls are, preferably, suitably channeled lengthwise thereof as illustrated at 68 in FIG. 5 and the upper end of said bore 63 is slightly enlarged to provide a seat 69 against which the retainer cap 61 engages. Retainer cap 61 thus serves both to secure the locking member 60 within the cover opening 66 and to close the vent opening (bore 63) therethrough when the locking member 60 is in a relaxed state (the cooker being in an unpressurized state). At its lower end, the locking member has an enlarged head portion integral with stem 62 and hereinafter termed a catch portion 70. As illustrated by FIG. 2 in the relaxed state of the locking member 60, its catch portions 70 hangs free of and below the cover 27. It will be appreciated that as pressure develops within the fluid tight cooker, catch portion 70 of the locking member 60 will start to rise, first raising retainer cap off its seat 69 to permit escape of cooler dry air. As pressure builds up in the cooker in excess of 0.5 p.s.i., unless restricted, catch portion 70 rises engaging its gasket 71 against the underside of the sleeve portion 65 to reseal the vent opening (bore 63) in which the locking member reciprocates.

Considering now FIG. 14 with FIGS. 10 and 11, it will be seen that the locking member 60 is so mounted to the cover that when the cover is initially assembled over the cooker body top, the locking member is located immediately ahead of the cover abutment. As illustrated by FIG. 2, in the initial location of the lock member, and before the cooker is heated to develop pressure therein, its catch portion 70 hangs below said horizontal abutment portion 52 of the abutment member. With clockwise rotation of the cover, the cover lugs 34 are urged beneath the cooker body lugs 36 to draw the cover 27 and its sealing gasket 40 against the top edge 37 of the cooker body as aforedescribed to affect a fluid tight seal of the cover to the cooker body. As this occurs, catch portion 70 of the locking member 60 also passes beneath abutment portion 52 until the protruding end of screw 30 constituting a stop 80 comes into engagement with the approaching cooker body lug 36. Stop 80 as illustrated by FIG. 16 is so located as to halt further rotation of the cover when the cover lugs 34 are centered beneath the cooker body lugs 36 and the catch portion 70 of the locking member has just cleared the cover abutment portion 52. Thus when the cover and cooker body lugs are optionally aligned to effectively seal the cover to the cooker, the locking member 60 has also been located to a position when it is free to function as a lock. In its locking position, as heat is applied to the fluid tight sealed cooker in the cooking act, the developing pressure within the pressure cooker acts on the catch portion 70 of the locking member 60 causing it to rise, lifting the retainer cap 61 off its seat 69 and allowing the cooler non-saturated air to escape from the cooker through the bore and its channels around the plunger. As the steam pressure builds up to approximately 0.5 p.s.i., catch portion 70 rises urging its gasket 71 against the underside of the sleeve bore 63 so as to reseal the vent opening which the sleeve bore 63 and its channels constitute. As illustrated in FIG. 4 in this "sealing position" of the catch portion 70, it is also located in the path of the abutment 52 where it will remain as long as more than 0.5 p.s.i. exists in the cooker. Any attempt to open the pressure cooker by counterclockwise rotating the cover to release the frictional engagement of its lugs 34 beneath the cooker body lugs 36 will be resisted by the abutment, resistance to clockwise rotation of the cover being continued by the stop 80. Thus, the cooker cannot be open. Once the cooking has been completed, and the cooker has been removed from the heat and its interior steam pressure reduced to less than 0.5 p.s.i., the catch portion automatically drops to a position below the level of abutment 52 and the unit can be properly and safely opened by rotating the cover in a counterclockwise direction.

It will also be appreciated that should the user accidentally or intentionally fail to completely center the cover lugs 34 beneath the body lugs 36, as by stopping cover rotation short of engagement with stop 80 (FIGS. 12 and 15), the catch portion 70 of the locking member will not have cleared the abutment 52. Therefore, when heat is applied to the cooker, although the catch portion 70 will rise to a height sufficient to lift the retainer cap 61 off its seat 68 it will be trapped by the abutment short of sealing the vent opening and the interior of the cooker will remain vented to the atmosphere so that the cooker is not dangerously pressurized and the cover can be safely removed.

A further feature of the invention is the novel location of an overpressure release plug 90 beneath the overhang 31 of the cover handle 28. As shown in FIG. 3, plug 90 has a grooved peripheral edge 91 by which it is releaseably caught on the surrounding edge of an opening 92 in the base of a depressed area or well 93 formed in the cover 27 beneath the handle overhang 31. At spaced intervals about said periphery, said plug 90 also has vertically extending channels 94 which prevent buildup of a vacuum inside the cooker due to rapid cooling. Plug 90 thus provides pressure relief separate from and independent of the pressure regulating valve 33 and the vent opening 63 in which the cover interlock member 60 operates to prevent pressure developing within the cooker to a dangerous level. As illustrated by FIG. 6, when the pressure level in the cooker exceeds a level for which the plug 90 is designed to resist, it is ejected from opening 92 but is confined or captivated within the well 93 by the handle overhang 31. As illustrated by FIGS. 6 and 8, terminal wall 31a of said handle overhang 31 is provided with a restricted opening 31b immediate thereto and adjacent the cover surface which allows fluid escaping from opening 92 in the base of wall 93 vacated by the ejected plug 90 to be directed away from the handgrip portion 28a of the cover handle and toward the central area of the cover in which direction it is least likely to come into contact with the user who, for example, might instinctively attempt to grasp the cooker by its handles 22, 28 to remove the pressure cooker from its heat source to halt the cooker process.

Figure 17:
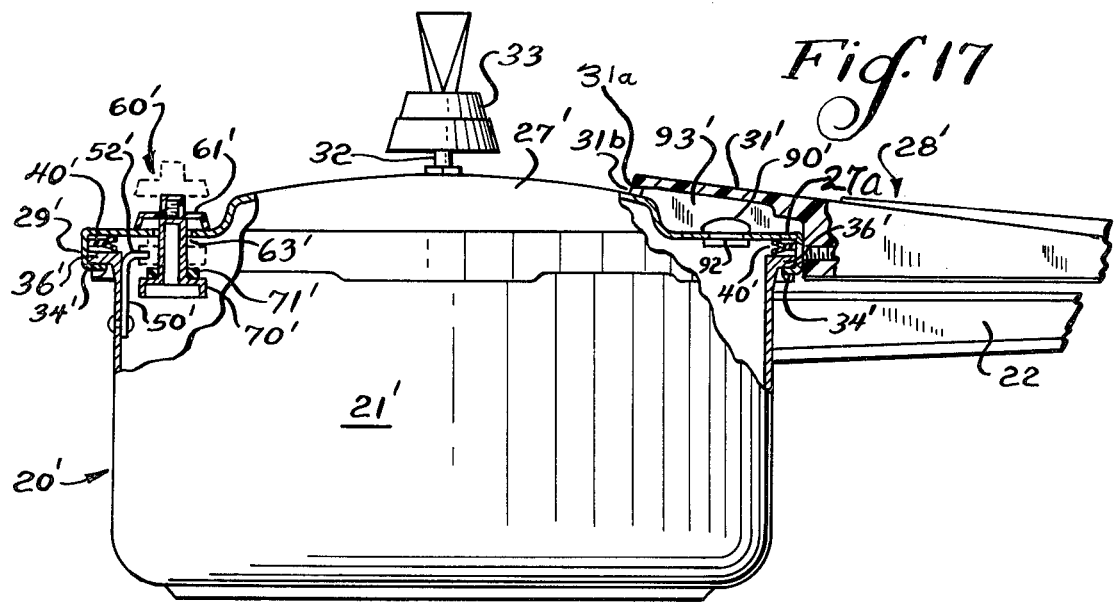
FIG. 17 illustrates a modification of the invention embodied in a pressure cooker of stamped metal such as aluminum or stainless steel.
Figure 18:
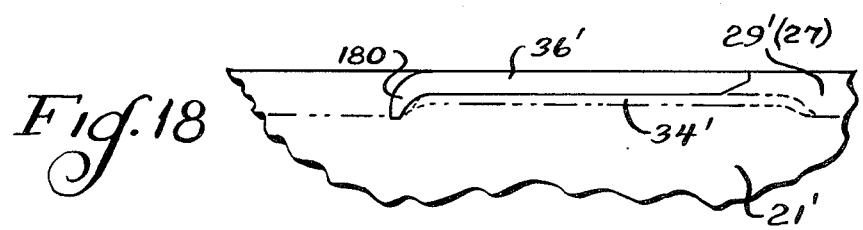
FIG. 18 illustrates an alternate construction of stop for limiting the rotation of the cover and thereby the location of the locking member in its operative position relative to the locking bracket of the cooker body.

In FIG. 17, a pressure cooker employing an alternate arrangement of the cover interlock and overpressure release plug in accordance with the invention is shown. In said FIG. 17, the pressure cooker is generally of a construction similar to that described in connection with the embodiment represented by FIG. 1 having a body 21' and a cover 27' with a margin 27a. The cooker includes interlock means comprising an abutment member 50' secured to body 21' and a locking member 61' reciprocably mounted to cover 27'. The top edge of its body 21', however, has an outwardly turned lip portion which is interrupted at spaced interval to provide circumferentially spaced lugs 36' corresponding to the previously described lugs 36 and intervening spaces 38. Similarly, flange 29' of cover 27' is formed with an inturned lip which is also relieved at regular intervals to provide circumferentially extending lugs 34' with spaces therebetween as described in connection with lugs 34 and spaces 35 of the first embodiment. Said lugs 34' and 36' are similarly in a specific pattern such that spaced lugs 34' of the cover can pass through the spaces between the cover lugs 36' only in one rotated position of the cover, from which position, the cover may be rotated relative to the cooker body to engage its lugs 34' beneath the cooker body lugs 36', drawing the cover down and compressing this time a vee-sectioned gasket 40' between the cover margin 27a and the lugs 36' of the cover body 21'. Again, in said one position of the cover assembly relative to the cooker body not only is the cover handle 28' displaced angularly from the cooker body handle 22' but the cover locking member 60' is located immediately ahead of the horizontal abutment portion 52' of the locking bracket fixed to the interior wall of the cooker body 21'. As in the first described embodiment, catch portion 70' of cover locking member 60' in its relaxed state hangs below the abutment 52' so that with clockwise rotation of the cover, it passes beneath the abutment until halted by a stop 80' which limits rotation of the cover to an angular extent sufficient that catch portion 70' is moved beyond and just clears the opposite edge of the abutment 52'. In the first described embodiment, said stop is illustrated at 80 as comprising the end of screw 30 which secures the cover handle to the cover. In this second embodiment of the invention, said stop is illustrated at 80' in FIG. 18 as comprising a downwardly turned lip on one of the body lugs 36'. It also will be appreciated that said turned lip 80' may be formed on any one or more or all of either the cover or cooker body lugs to obtain the same useful result. It will be further appreciated that in both embodiments, preferably the angle through which the cover is rotated, to move the locking member and its catch portion clear of the abutment fixed to the cooker body, corresponds to an angle which is sufficient to move the cover handle from an offset relation to the cooker body handle 22 to one in superimposed relation thereover.

A feature of the alternate embodiment illustrated by FIG. 17, is that the mounting sleeve 64 has been omitted and the stem of the locking member is reciprocally mounted in a vent opening 63' in margin 27a of the cover itself. Also, in the alternate embodiment, the retainer cap 61' is internally threaded to threadedly connect to stem 62 and is constructed of a resilient plastic such as polypropylene. As shown in FIG. 17, retainer cap 61' is recessed on its underside so that its edge engages with the surrounding margin of the cover rather than being received within a provided seat in the outer end of a mounting sleeve 64.

FIG. 17 also illustrates an alternate arrangement for captivating an overpressure release plug 90 beneath the overhang 31' of the cover handle 28 when it is ejected from the cover. In said alternative arrangement, an opening 92' is provided in the flat marginal portion of the cover, the edges of which are caught in the peripheral groove of the overpressure release plug 90'. The underside of the handle overhang 31', however, has been reshaped to provide a cavity with sidewalls which substantially abut the flat surface of the cover about the plug and so provide an area or cavity 93' corresponding to well 93 which receives the plug 90' when it is ejected. Again, an opening 31B provided in the terminal wall 31a of the handle overhang which is insufficient to permit release of the ejected plug permits the escaping fluids to exit from beneath the handle overhang and be directed away from the handle.

Thus, it will be seen that a cooker according to the disclosed invention may be safely utilized by persons having a minimum of instruction or experience in the use and operation of pressure cookers. The cover lock abutment fixed to the cooker body and the cooperating locking member and catch portion reciprocally mounted to the cover are related to each other and to the inter-engaging cover lugs and body lugs so that the cover can be closed fluid tight only when the cover has been first assembled over the open top of the cooker body to locate the locking member properly relative to the cover abutment portion. In any position of the cover ineffective to locate the locking member in its pressure actuated locking position, the cooker remains vented to the surrounding atmosphere and dangerously high pressure does not build up in the cooker. Additionally, the pressure regulating valve acts to permit pressure to develop within the fluid tight and locked cooker until a pre-selected cooking pressure develops in the cooker, the value by reason of its rocking mount on the vent pipe thereafter maintaining the cooker at said pressure level. In the event the vent pipe becomes clogged during cooking, or for any other reason the pressure valve becomes inoperative to regulate pressure and the pressure within the cooker approaches a dangerous level, the over pressure release plug located in the margin of the cover is ejected to relieve said pressure build up. The ejected plug is captivated by the overhang of the handle so that the plug does not fly unrestricted into the surrounding environs and the escaping are directed away from the handle. Thus, a truly effective pressure cooker and one designed to minimize possible injury to the user and the surrounding environs during the cooking operation has been provided.

Thus it will be apparent from the aforesaid description of preferred embodiments, the invention clearly realizes all of the objects, advantages and features recited therefor.

Having described the invention, what we claim is:

1. A pressure cooker comprising an open top body and a cover which is closeable against the cooker about its open top in one related position only, the cover when closed in said one position against the cooker body being rotatable relative thereto through an angle of limited extent sufficient to effect a fluid tight connection therewith, said cooker body having an interiorly-located abutment adjacent the edge of its open top, the cover having a vent opening adjacent said edge in which is supported the stem of a vertically-reciprocatable lock member, said lock member being located at one end of the abutment member when initially closed in said one position against the cooker body, said lock member including a catch portion which passes beneath the abutment as the cover is rotated to a locking position beyond the abutment as the cover completes its rotation through said angle, said catch member when in said locking position being capable of rising to close the vent opening as pressure commences to develop in the cooker and be retained by said pressure at a height where it inhibits reverse rotation of the cover to its initial position, the catch portion being prevented by the abutment from rising to close the vent opening when the cover is incompletely rotated whereby pressure can build up in the cooker only when the lock member is in its locking position to prevent removal of the cover.

2. A pressure cooker as claimed in claim 1 wherein the stem of the lock member includes a cap portion which seats over the vent opening when the lock member is in its relaxed position, the stem of the lock member incompletely filling the vent opening such that as the lock member starts to rise, and the cap portion lifts off its seat, air can escape as steam pressure builds until the catch portion is halted by its engagement with the cover and reseals the vent opening.

3. A pressure cooker as claimed in claim 2 wherein the vent opening of the cover is defined by a sleeve member fixed in the cover, said sleeve member having a central bore through which the stem of the locking member extends, the wall of said bore having spaced vertical channels.

4. A pressure cooker as claimed in claim 1 wherein the cover has a pressure-regulating valve and a pressure-ejectable plug spaced from said pressure regulating valve.

5. A pressure cooker as claimed in claim 4 wherein the cover and cooker each have handles which align one over the other when the cover has been rotated through said limited angle to locate the lock member in its locking position and the cover fluid tight to the cooker body.

6. A pressure cooker as claimed in claim 1 wherein the cover contains a pressure-ejectable plug diametrically opposite the vent opening in which the lock member is supported, and an operating handle fixed to the cover has an overhang portion spaced above the plug to captivate the plug when ejected therefrom the cover.

7. A pressure cooker as claimed in claim 6 wherein the cover has a recessed area beneath the handle overhang, the base of said recessed area containing the pressure-ejectable plug.

8. A pressure cooker as claimed in claim 6 wherein the terminal wall of the handle overhang has a restricted opening through which fluids escaping from the cover opening vacated by the ejected plug are directed away from the handle.

9. A pressure cooker as claimed in claim 7 wherein the terminal wall of the handle overhang has a restricted opening partially lapping the recessed area through which fluid escapes from said recessed area when the plug is ejected.

10. A pressure cooker comprising, in combination, a food receiving body having a cover for closing the open top thereof, said cover having a key portion which must be located in a receiving portion of the cooker body to permit closing the cover against the open top thereof, said cover when closed against the cooker body being rotatable in one direction relative thereto so as to establish a fluid type seal therebetween, and stop means limiting the angle to which the cover is rotatable in said one direction, the cooker body having an interiorly-located abutment adjacent its top edge the angular extent of which is less than the angle through which the cover is rotatable, said cover having a vent opening, a lock member having a stem slidably retained in said vent opening, the lock member being initially positioned immediately adjacent one end of said abutment when the cover is initially closed against the body, the lock member having a catch portion which hangs below the level of the abutment when the lock member is in a relaxed state so as to pass beneath the abutment as the cover is rotated to establish said fluid tight seal between the cooker body and cover, said catch portion of the abutment lock member just clearing the other end of the abutment when the cover has been rotated through the full angle permitted by the stop means such that the lock member is free to rise as pressure develops in the cooker to seal said vent opening and locate its catch portion at the level of the abutment where it locks the cover against reverse rotation when the cooker is in a pressurized state, said catch portion of the lock member being trapped by the abutment should the cover be incompletely rotated to avoid pressure build up with the cooker.

11. A pressure cooker as claimed in claim 10 in which the stop means limit relative rotation of the cover in said one direction to an angular extent approximating the angular extent occupied by the catch portion and the abutment.

12. A pressure cooker as claimed in claim 10 wherein the lock member has a cap portion attached to its stem which is located exteriorly of the cover to engage about and close the vent opening when the lock member is in a relaxed state.

13. In a pressure cooker embodying a vessel having a circular open top and a cover for closing said top, said cover having a depending circular flange which extends about the vessel top edge, the vessel having first circumferential extending spaced lugs disposed adjacent the vessel top edge, the cover flange having second circumferentially extending spaced lugs which are spaced to pass between the first lugs to a level therebelow when the cover is closed over the vessel open top, a seal member engageable between the vessel top edge and the cover when the cover is rotated on the vertical axis of the vessel open top to move the second lugs into underlying engagement with the first lugs to effect a fluid tight connection of the cover to the vessel, the improvement wherein the vessel has an interiorly located abutment adjacent the edge of its open top and the cover has a vertically reciprocal lock member embodying a stem having an attached large lower catch portion, the stem hanging loose in a provided vent opening in the cover in the unpressurized condition of the cover-closed vessel so as to locate its lower catch portion at a level below the abutment, said first and second circumferentially extending lugs being so sized and spaced that the second lugs can be lowered through the spaces between the first lugs to close the cover over the vessel only in a position which locates the catch portion of the lock member to a first side of the abutment, the cover further having stop means which limit relative rotation of the cover and vessel through an angular extent which is just sufficient to align the second lugs beneath the first lugs and pass said catch portion beneath the abutment from said first side thereof, said lock member when its catch portion is clear of the abutment being free to rise to close the vent opening and locate its catch portion at the level of the abutment so that the cover cannot be reverse-rotated and remains locked against separation from the vessel when in a pressurized state, the catch portion catching beneath the abutabutment when the cover is incompletely rotated to prevent pressure build up in the vessel except when the second lugs are properly aligned beneath the first lugs characterizing the fully closed position of the cover and the catch portion is clear of the abutment.

14. In a pressure cooker embodying a vessel having an open top, a removable cover sealable to the vessel over said open top and a pressure relief valve which regulates pressure development therein during cooking, the combination therewith of an overpressure release plug releaseably sealed within an opening in a marginal portion of the cover so as to normally close the opening and be ejectable from the opening to vent the interior of the cooker through the opening to atmosphere when excess pressure developes within the vessel, and a handle fixed to the cover including a hand grip portion which projects radially from the cover and an overhang portion which overlies said marginal portion of the cover containing the overpressure release plug, said marginal portion of the cover and overhang portion of the handle being so shaped as to provide a cavity therebetween in which the overpressure release plug is captivated when it is ejected from the opening in the cover, said overhang portion of the handle having an opening in its side directed away from the handle grip portion which is of a size insufficient to permit escape of the plug from said cavity and directs the escaping fluids toward the center of the cover and away from the hand grip portion of the handle.

15. The combination of claim 14 wherein the cover has a centrally disposed vent pipe and the pressure relief valve removably seats on said vent pipe.

16. The combination of claim 15 wherein the cover also has a pressure-activated interlock separate from the pressure relief valve and the overpressure release plug which prevents separation of the cover from the cooker vessel when the interior of the cooker is in a pressurized state and prevents pressure build up in the cooker when its cover is incompletely closed therewith.

17. The combination of claim 14 wherein the marginal portion of the cover beneath the overhang portion of the handle comprises a well the base of which contains the opening in which the overpressure release plug is releaseably fixed.

18. The combination of claim 14 wherein the underside of the handle overhang portion is shaped as a cavity which overlies the marginal portion of the cover containing the overpressure release plug.

19. The combination of claim 18 wherein the marginal portion of the cover beneath the handle overhang portion is generally flat.

20. A pressure cooker comprising, in combination:
a body, having an open top with a peripheral sealing surface, a normally vertical central axis, and a handle extending outward radially;
a cover, for closing the open top of said body, having a rim with a peripheral sealing surface, a plurality of venting passages, and a handle extending outward radially, said cover and said body being mutually rotatable about said axis between a first relative position, in which said handles are in alignment, and a second relative position, in which said handles are out of alignment by a predetermined angle at said axis;
engagement means for enforcing engagement between said sealing surfaces in said first relative position of said cover and said body, to provide a seal for said cooker;
engagement preventing means carried in part by said body and in part by said cover for preventing initial engagement between said sealing surfaces except in said second relative position at only said predetermined angle;
and further independent safety lack means carried in part by said cover and in part by said body for preventing relative movement from said first position to said second position during a superpressure condition when the pressure sealed in said cooker exceeds that ambient to said cooker by more than a predetermined amount, and for venting said cooker except during said superpressure condition in said first relative position.

21. A pressure cooker according to claim 20 in which said further means comprises
an abutment, located internally of said body adjacent to said open top, of peripheral extent less than said predetermined angle;
and a lock member, traversing one of said venting passages adjacent to said rim of said cover at a position therein where it is adjacent to and beyond one end of said abutment in said first relative position, and adjacent to and beyond the other end of said abutment in said second relative position,
said lock member comprising a stem easily slidable in said one venting passage between inward and outward positions,
and a catch member carried on said stem within said cover and effective in said outward position of said stem to close said venting passage and to engage said abutment for preventing mutual rotation between said cover and said body out of said first position.

22. A pressure cooker according to claim 20 in which said further means comprises
an abutment, located internally of said body adjacent to said open top, of peripheral extent less than said predetermined angle;
and a lock member, traversing one of said venting passages adjacent to said rim of said cover at a position therein where it is adjacent to one end of said abutment in said first relative position, and adjacent to the other end of said abutment in said second relative position,
said lock member comprising a stem easily slidable in said one venting passage between inward and outward positions, and a catch member carried on said stem within said cover,
said abutment being effective when said cover and said body are between said first and second relative positions, to engage said catch member and prevent movement of said stem into said outward position.

23. A pressure cooker according to claim 20 in which said further means comprises
an abutment, located internally of said body adjacent to said open top, of peripheral extent less than said predetermined angle;
and a lock member, traversing one of said venting passages adjacent to said rim of said cover at a position therein where it is adjacent to one end of said abutment in said first relative position, and adjacent to the other end of said abutment in said second relative position,
said lock member comprising a stem easily slidable in said one venting passage between inward and outward positions, and a catch member carried on said stem within said cover and effective in said outward position of said stem to close said venting passage and to engage said abutment for preventing mutual rotation between said cover and said body out of said first position, said abutment being effective when said cover and said body are between said first and second relative positions to engage said catch member and prevent movement of said stem into said outward position.

24. A pressure cooker according to claim 21, including means limiting the inward sliding of said stem and simultaneously closing said one venting passage.

25. Apparatus according to claim 20 in which a first of said venting passages contains an overpressure release plug, and a portion of said further means traverses a second of said venting passages.

26. Apparatus according to claim 25 in which said handle of said cover defines with said cover a chamber to retain said plug when actuated from the first named passage by overpressure within said cooker.

27. Apparatus according to claim 26 in which said chamber is provided with an outlet to direct fluids discharged through the first named passage towards said axis.

* * * * *

UNITED STATES PATENT AND TRADEMARK OFFICE
CERTIFICATE OF CORRECTION

PATENT NO. : 4,162,741
DATED : July 31, 1979
INVENTOR(S) : Duane Walker and Darrell Quarderer It is certified that error appears in the above-identified patent and that said Letters Patent are hereby corrected as shown below:

Column 3, line 38, "an" should be --can--;

Column 10, line 39, "are" should be --fluids--;

Column 12, line 65, "abutabutment" should be --abutment--

Column 13, line 13, "developes" should be --develops--;

Column 14, line 3, "lack" should be --lock--.

Signed and Sealed this

Fourth Day of December 1979

[SEAL]

Attest:

SIDNEY A. DIAMOND

*Attesting Officer* — *Commissioner of Patents and Trademarks*